United States Patent [19]
Shiraishi et al.

[11] Patent Number: 4,792,166
[45] Date of Patent: Dec. 20, 1988

[54] DEVICE FOR LOCKING DETACHABLE ROOF IN MOTOR VEHICLE

[75] Inventors: Daiichi Shiraishi, Seto; Shingo Satoh, Sagamihara, both of Japan

[73] Assignee: Toyota Jidosha Kabushiki Kaisha, Japan

[21] Appl. No.: 27,953

[22] Filed: Mar. 19, 1987

[30] Foreign Application Priority Data

Mar. 20, 1986 [JP] Japan .................... 61-063556

[51] Int. Cl.⁴ .................................. E05C 9/04
[52] U.S. Cl. ........................ 292/36; 292/DIG. 5; 292/DIG. 60
[58] Field of Search .............. 296/224, 137 B; 292/7, 292/36, 39, DIG. 5, 341.18, DIG. 60

[56] References Cited

U.S. PATENT DOCUMENTS

| | | | |
|---|---|---|---|
| 859,531 | 7/1907 | Strauss | 292/39 |
| 2,847,240 | 9/1958 | Stone et al. | 292/70 |
| 3,385,624 | 5/1968 | Baclini | 292/341.18 |
| 4,193,618 | 3/1980 | Lee et al. | 292/39 X |
| 4,195,866 | 4/1980 | Tundo et al. | 292/DIG. 5 X |
| 4,223,943 | 9/1980 | Van Hulle et al. | 292/DIG. 5 X |
| 4,540,215 | 9/1985 | Swearingen | 292/36 X |

FOREIGN PATENT DOCUMENTS 60-68157  5/1985  Japan .

Primary Examiner—Richard E. Moore
Attorney, Agent, or Firm—Parkhurst, Oliff & Berridge

[57] ABSTRACT

A device for fixing a roof detachable from a motor vehicle body to the vehicle body. The detachable roof is provided thereon with first and second lock pins guided by guides and projectable in directions opposite to each other. These lock pins are inserted into lock holes formed in the vehicle body, whereby the detachable roof can be fixed to the vehicle body. The guides have a plurality of fixed positions around the axis of respective mounting holes of the detachable roof. A guide hole formed in the guides is made eccentric with the center axis of each guide such that a straight line from the center of the guide hole to the center axis of the mounting hole of the detachable roof is inclined to the horizontal line, whereby positional differences between the outer surface of the detachable roof and the main roof body surface, when the detachable roof is locked in place, may be minimized.

20 Claims, 12 Drawing Sheets (A)

(B)

DEVICE FOR LOCKING DETACHABLE ROOF IN MOTOR VEHICLE

BACKGROUND OF THE INVENTION

1. Field of the Invention

This invention relates to improvements in a device for locking a detachable roof when the roof located upwardly of a driver's seat and passenger's seat in a motor vehicle is made detachable.

2. Description of the Prior Art

Recently, there has been commercialized a motor vehicle having a so-called T-bar roof.

A detachable roof in the motor vehicle of the type described is constructed such that, in the detached state of the detachable roofs, openings contiguous to door openings of side doors positioned outside the driver's seat and the passenger's seat are formed to accommodate the roofs.

Furthermore, in a state where the detachable roof is mounted to a motor vehicle body, the vehicle body is formed with a roof surface flush with a roof body.

In the state where the detachable roof is mounted to the motor vehicle body, a locked state should be reliably maintained so that the detachable roof does not generate vibrations during running of the motor vehicle.

Examples of devices for locking a detachable roof in a motor vehicle for the above-described purpose are disclosed, for example, in U.S. Pat. No. 4,193,618, and Japanese Utility Model Laid-Open No. 68,157/1985.

Each of the lock devices disclosed in these examples include:

first and second levers rotatably mounted to the detachable roof and being in mesh with each other in a manner to be rotatable in synchronism with each other in directions opposite to each other;

first and second lock pins axially, linearly, movably supported on the detachable roof by means of guides at positions opposite to each other with the first and the second levers interposed therebetween, connected to the first and the second levers, respectively, through connecting mechanisms, and insertable at the forward ends thereof into lock holes formed in a motor vehicle body and opposed to the lock pins; and a control lever connected to one of the first and the second levers to rotate the same.

In the state where the above-described detachable roof is mounted, if the outer surface of the detachable roof is shifted in position from the main roof body surface, then the seal between the detachable roof and the main body of the roof becomes unsatisfactory, thus causing water leakage and the like such as in the case of rain.

Furthermore, in the above-described lock device, when the pair of lock pins to be inserted into the lock holes formed in the motor vehicle body's sides are shifted in position from the lock holes, the force necessary for operation of the control lever is increased, thus lowering the controllability thereof.

In contrast thereto, as disclosed in U.S. Pat. No. 4,223,943 for example, the lock pins are secured to a bush eccentrically to the bush, whereby the bush is made fixable at a plurality of positions around the axis thereof, so that the lock pins can be fixed at the optimal eccentric positions.

More specifically, the directions of eccentricity of the lock pins are changed, so that the shift in position between the detachable roof and the main roof body surface can be compensated for.

However, the above-described lock device presents such a problem that, in the above-described lock device, parts for fixing the bush, such as pins, are needed, whereby the number of parts as a whole is increased, so that the construction thereof becomes complicated.

Further, such a problem is presented that the pins are engaged with the bush, whereby the position of the bush in the circumferential direction is fixed, so that the reliability is unsatisfactory.

SUMMARY OF THE INVENTION

The present invention has been developed to obviate the above-described problems of the prior art and has as its object the provision of a device for locking a detachable roof in a motor vehicle, wherein the number of parts is small, the construction is simplified and the reliability is high.

To achieve the above-described object, the present invention contemplates a device for locking a detachable roof in a motor vehicle, including:

first and second levers rotatably mounted to the detachable roof and being in contact with each other in a manner to be rotatable in synchronism with each other in directions opposite to each other;

first and second lock pins axially, linearly movably supported on the detachable roof by means of guides at positions opposite to each other on the detachable roof with the first and the second levers interposed therebetween, the first and second lock pins being connected to the first and the second levers, respectively, through connecting mechanisms, and insertable at the forward ends thereof into lock holes formed in a motor vehicle body and opposed to the lock pins; and a control lever connected to one of the first and the second levers to rotate the same, wherein the lock hole and the guide are provided such that one of the lock holes and the guide is made eccentric to the center axis of the other and the one is formed into a form which can take a plurality of fixed positions around the center axis of the other.

Further, to achieve the above-described object, the present invention contemplates in that, at least one of the guides (hereinafter "the guide") is inserted into a mounting hole of the detachable roof in the axial line of the lock pin and supported thereby, the cross sections of the mounting hole and the guide to be inserted into the mounting hole are of such shapes that the guide can take a plurality of fixed positions around the center axis of the mounting hole, a guide hole for guiding the lock pin in the guide is made eccentric with the center axis of the mounting hole.

Further, to achieve the above-described object, the present invention contemplates that the shape of the mounting hole is made symmetrical with respect to a vertical line and a horizontal line, respectively.

Still further, to achieve the above-described object, the present invention contemplates that, in a state where the guide is mounted to the mounting hole at the plurality of mounted positions, the guide hole in the guide is made eccentric such that the center of the guide hole is located on either one of a normal line to the outer surface of the detachable roof and passing through the center of the mounting hole and a straight line perpendicularly intersecting the normal line and passing through the center of the mounting hole.

Further yet, to achieve the above-described object, the present invention contemplates that the cross sections of the mounting hole and the guide are of generally cross shape.

Furthermore, to achieve the above described object, the present invention contemplates that a straight line from the center of the eccentric guide hole to the center axis of the mounting hole is inclined with respect to a horizontal line.

Further, to achieve the above-described object, the present invention contemplates in that, at least one of the lock holes is formed in a guide bush inserted into a mounting hole on the motor vehicle body in an axial line of the lock pin and supported thereby; cross sections of the mounting hole and the guide bush to be inserted into the mounting hole are of such shapes respectively that the guide bush can take a plurality of fixed positions around the center axis of the mounting hole; and the lock hole is made eccentric with the center axis of the mounting hole.

Further, to achieve the above-described object, the present invention contemplates in that the shape of the mounting hole is symmetrical about two perpendicular axes.

Further, to achieve the above-described object, the present invention contemplates in that, in a state where the guide bush is mounted to the mounting hole atthe plurality of mounted positions, the lock hole in the guide bush is made eccentric such that the center axis of the lock hole is located along either one of a line normal to the outer surface of the detachable roof and passing through the center of the mounting hole, and a straight line perpendicularly intersecting the normal line and passing through the center of the mounting hole.

Further, to achieve the above-described object, the present invention contemplates in that a straight line from the center of the eccentric lock hole to the center axis of the mounting hole is inclined with respect to a horizontal line.

According to the present invention, the guide for guiding the lock pin has such a shape as to take the plurality of fixed positions around the center axis of the mounting hole of the detachable roof, further, the guide hole for guiding the lock pin is made eccentric with the center of the guide, whereby the position of the guide mounted to the mounting hole can be suitably selected to adjust the direction of eccentricity of the guide hole to the center of the guide, so that the projecting position of the lock pin can be adjusted relative to the detachable roof, thereby enabling the prevention of a shift in position of the detachable roof from the main body of roof in the mounted state.

Furthermore, adjustment of the mounted positions of the guide around the axis thereof with the mounting hole formed in the detachable roof is achieved by an unusual shape capable of taking a plurality of fixed positions, so that fixing of the guide to the mounting hole at the respective fixed positions can be made firm and reliable.

Further, pins and the like for maintaining the state where the guide is mounted to the mounting hole can be dispensed with, so that the number of parts can be reduced and the construction can be simplified.

DETAILED DESCRIPTION OF THE PREFERRED EMBODIMENT

Description will hereunder be given of the embodiment of the present invention with reference to the drawings.

Figure 1:
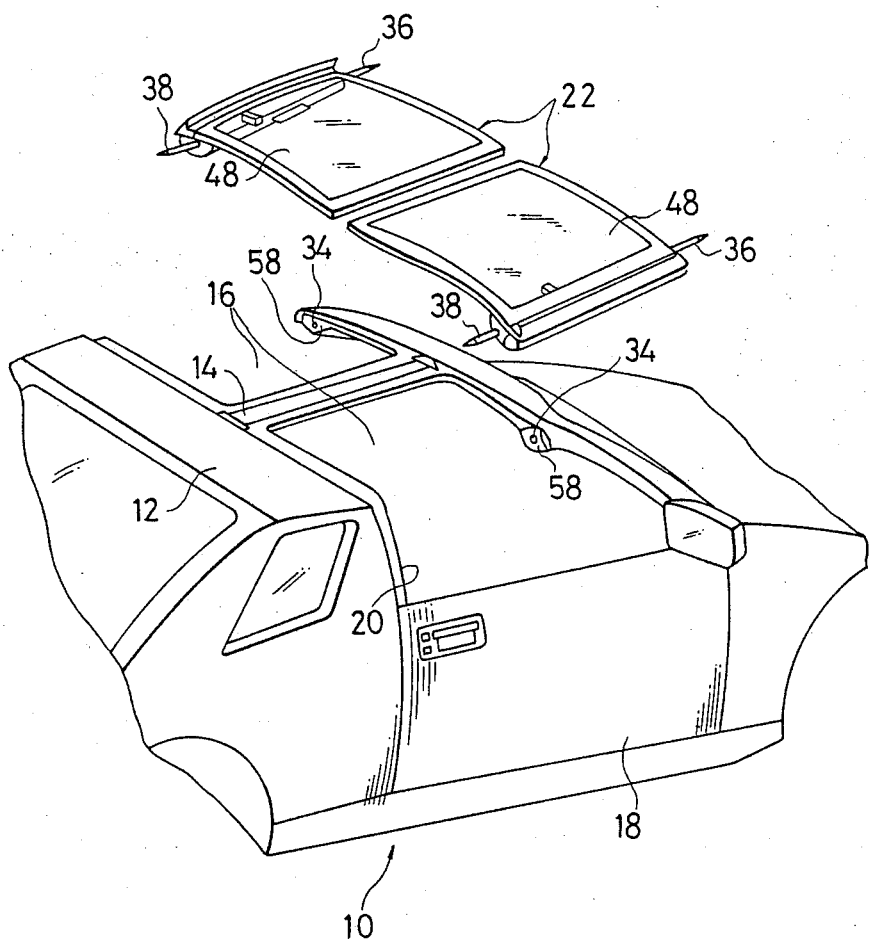
FIG. 1 is a disassembled perspective view showing the detachable roof in a motor vehicle, to which the lock device according to the present invention is applied, and the proximity of the roof in the motor vehicle.

As shown in FIG. 1, a roof 12 in a motor vehicle 10 is formed with a pair of right and left roof openings 16 located at positions on the opposite sides of a center bar 14, center bar 14 interposed therebetween, at positions above a driver's seat and a passenger's seat.

Each of the roof openings 16 are contiguous to a door opening 20 for a side door 18.

A pair of right and left detachable roofs 22 according to the present invention are accomodated in the roof openings 16 in a manner to close the pair of openings 16. A lock device 24 for fixing the detachable roof 22 to the motor vehicle 10 with the roof opening 16 being closed includes: a first lever 26 and a second lever 28 rotatably mounted to the detachable roof 22 and being in mesh with each other by means of gears 26A and 28A thereof in a manner to be rotatable in synchronism with each other in directions opposite to each other; first and second lock pins 36 and 38 axially, linearly, movably supported on the detachable roof 22 by means of guides 30 at positions opposite each other in the longitudinal directions of a vehicle body, connected to the first and the second levers 26 and 28 interposed therebetween, respectively, through connecting mechanisms 32, and insertable at the forward ends thereof into lock holes 34 formed in the roof 12 opposed to the lock pins 36 and 38; and a control lever 40 connected to the first lever 26 to rotate the same. The guides 30 are inserted into mounting holes 108 of the detachable roof 22 in the directions of the axes of the lock pins 36 and 38 and supported thereby, the cross-sectional shapes of the mounting hole 108 and the guide 30 to be inserted into the mounting hole 108 are of such shapes that the guide 30 can take a plurality of fixed positions around the center axis of the mounting hole 108, and a guide hole 110 of the guide 30, for guiding the lock pin is made eccentric with the center axis of the mounting hole 108.

Figure 2:
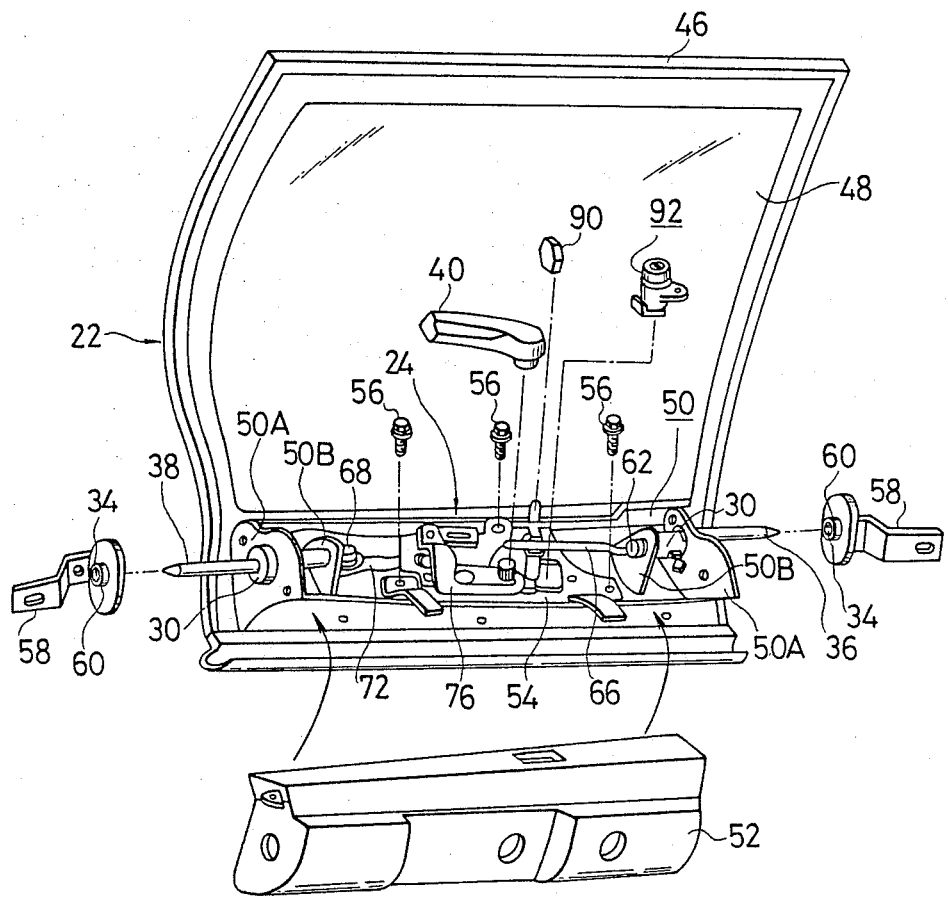
FIG. 2 is a disassembled perspective view showing the detachable roof provided with the lock device according to the present invention.

Designated at 48 in FIGS. 1 and 2 is a glass pane constituting a main part of the detachable roof 22; at 50, a lock base secured to the undersurface of an outer end portion of the glass pane 48 in the widthwide direction of the vehicle body; at 52, a garnish for shielding the outer surface of the lock base 50; and at 46, a molding for protecting a tail end portion of the glass pane 48.

As shown in FIG. 2, a portion of the lock device 24 excluding the guides 30 is secured to a base plate 54, which is locked and fixed to the lock base 50 through three bolts 56.

Figure 3:
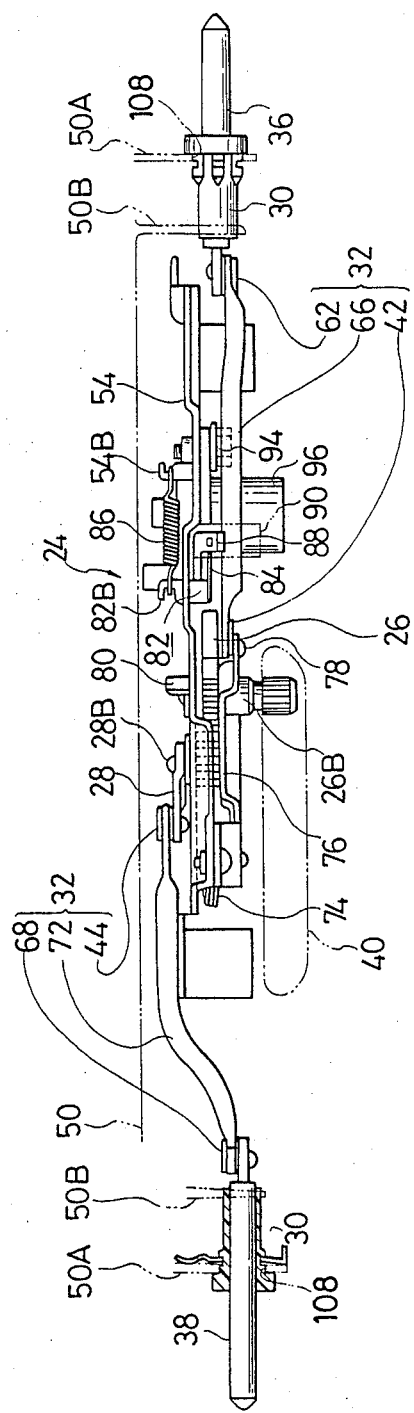
FIG. 3 is a front view showing an embodiment of the lock device according to the present invention.
Figure 4:
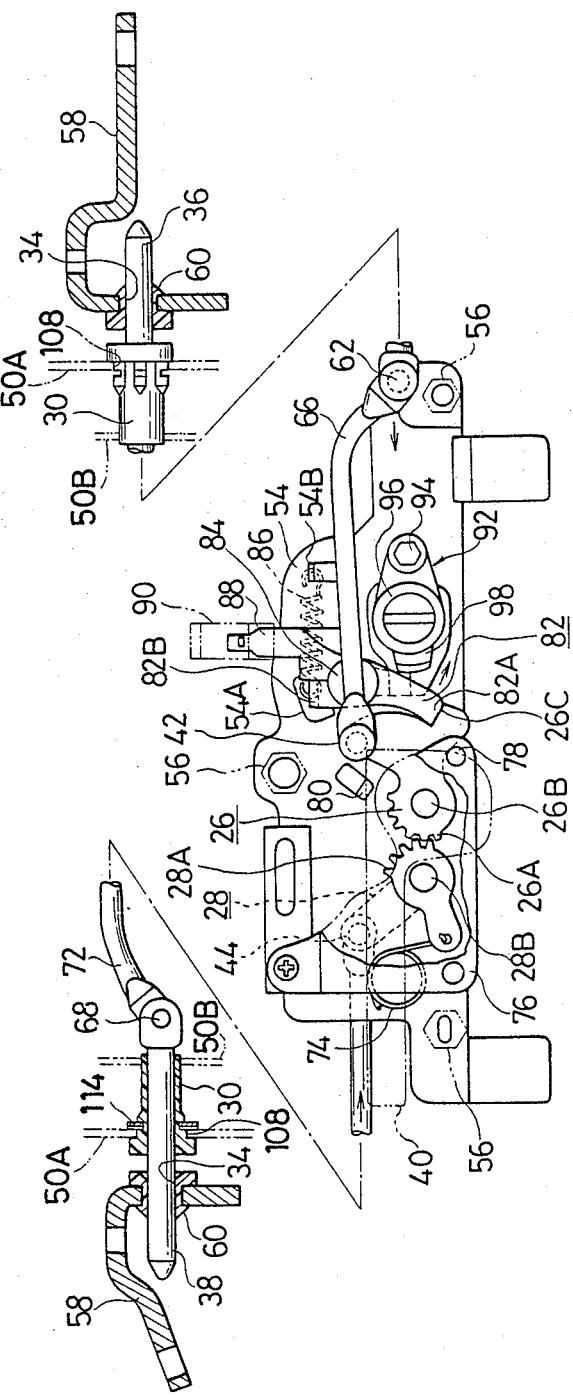
FIG. 4 is a plan view showing the above embodiment as seen from an automobile passenger compartment.

As shown in FIGS. 3 and 4, mounting holes 108 for mounting the guides 30 are formed in outer ribs 50A out of two pairs of ribs 50A and 50B. Ribs 50A are formed at opposite end portions in the longitudinal direction of the vehicle and ribs 50B are formed at positions slightly inwardly spaced apart from the opposite end portions.

The mounting hole 108 is of a generally cross shape, in which four engageable recesses 108A are outwardly formed from a circular hole in the radial directions at equiangular intervals of 90°.

Furthermore, the ribs 50B inwardly spaced apart from the ribs 50A and in parallel thereto are formed with circular holes 112 each having a diameter smaller than the mounting hole 108 and being concentrical therewith.

The guide 30 includes: a diametrically narrowed-down portion 30A, the forward end portion of which extends through the mounting hole 108, and further, is inserted and coupled into the circular hole 112 of the rib 50B; engageable raised portions 30B provided on the intermediate portions in the axial direction thereof, and inserted and coupled into the mounting hole 108; and a flange portion 30C provided at the proximal end thereof, for locking against dislodging of the guide 30, toward the forward end thereof.

Four of the engageable raised portions 30B are radially outwardly raised around the center axis of the guide 30 at equiangular intervals of 90° and are adapted to engage four engageable recesses 108A of the mounting hole 108.

Provided at intermediate positions in the axial direction from the engageable raised portions 30B are slits 30D in the circumferential direction of the guide 30. When the guide 30 is inserted and coupled into the mounting hole 108 and the circular hole 112, a retainer 114 is inserted into these slits 30D in a direction of perpendicularly intersecting the axial line of the guide 30 along the rear surface of the rib 50A, thus constituting a lock against dislodging of the guide 30.

Figure 9:
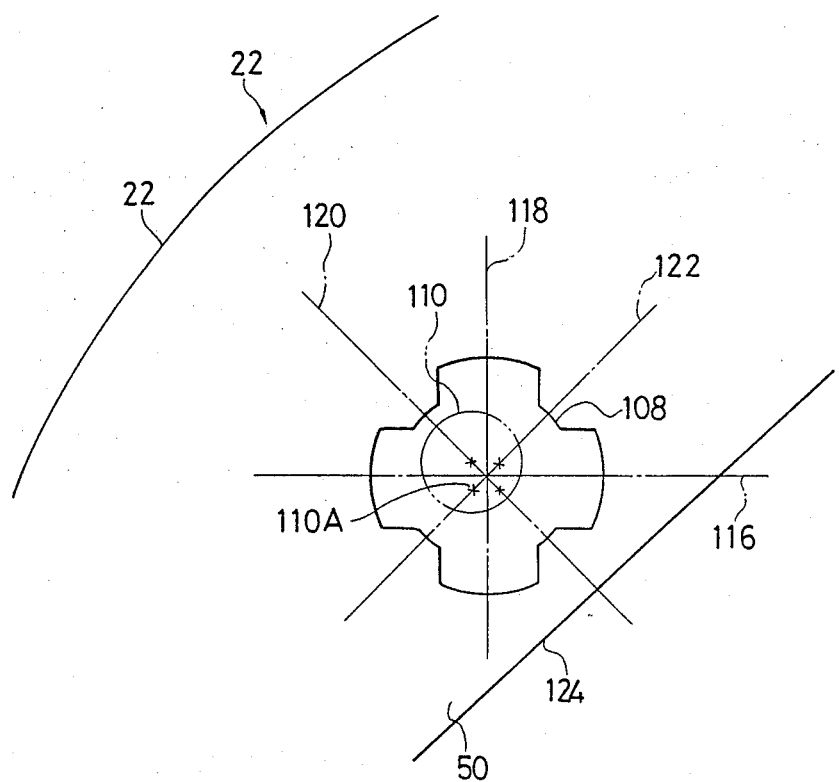
FIG. 9 is a schematic front view showing the positional relationship between the mounting hole for the guide and the outer surface of the detachable roof in the above embodiment.

Here, the engageable recesses 108A of the mounting hole 108 and the engageable raised portions 30B of the guide 30 have shapes symmetrical with respect to the horizontal line 116 and the vertical line 118, respectively, as shown in FIG. 9.

Further, as shown in FIG. 9, the center 110A of the guide hole 110 is formed eccentric to the center axis of the guide 30. The guide hole 110 is made eccentric such that the center axis of the center 110A is located on a line 120 normal to the outer surface 22A of the detachable roof 22 and passing through the center of the guide 30 or a straight line 122 perpendicularly intersecting the normal line 120 and passing through the center of the guide 30 in a state where the guide 30 is mounted to the mounting hole 108 at the mounted positions.

Furthermore, the lock holes 34 in the roof 12 are each formed in a guide bush 60 inserted into a bracket 58. As shown in FIG. 1, the brackets 58 are secured to outer side positions in the widthwise directions of the vehicle body of the front end face and the rear end face, not shown, of the roof openings 16 in the roof 12.

The base plate 54 is spaced apart from the bottom face of the lock base 50 (Refer to FIG. 3).

The first lever 26 is disposed on the front surface of the base plate 54, i.e., on the side of the garnish 52. The second lever 28 is disposed on the rear surface of the plate 54, i.e., in a space formed between the bottom face of the lock base 50 and the base plate 54.

The base plate 54, the first lever 26 and the second lever 28 are in parallel to one another.

As a consequence, a rotary shaft 26B of the first lever 26 and a rotary shaft 28B of the second lever 28 perpendicularly intersect the base plate 54, and are in parallel to each other.

Here, the gear 28A of the second lever 28 is formed on a portion of the rotary shaft 28B, protruding from the base plate 54 to the outer side.

More specifically, the main body of the second lever 28 and the gear 28A are arranged on the rear surface and the front surface of the base plate 54, respectively, with the base plate 54 interposed therebetween, and being shifted in position from each other in the axial direction of the rotary shafts 26B and 28B.

The gear 26A of the first lever 26 is formed integrally with the main body of the first lever 26 on the front surface of the base plate 54.

The connecting mechanisms 32 include: a first link 66 connected at one end thereof to the proximal end of the first lock pin 36 through a pin 62 and at the other end thereof to the first lever 26 through the pin 42; and the second link 72 connected at one end thereof to the proximal end of the second lock pin 38 through a pin 68 and at the other end thereof to the second lever 28 through the pin 44. The first link 66 and the second link 72 convert the rotary motions of the first and the second levers 26 and 28 into reciprocatory motions and transmit the same to the first and the second lock pins 36 and 38, respectively.

Here, as shown in FIG. 3, the first lock pin 36 and the second lock pin 38 are disposed generally in parallel to and substantially on the same axial line as the base plate 54, the first lever 26 and the second lever 28.

. Furthermore, the first link 66, and the pins 42 and 62 provided at opposite ends thereof are arranged substantially in the same plane as the first lock pin 36 and the second lock pin 38.

In contrast thereto, the second link 72 is curved upwardly in FIG. 3 from the pin 68 on the side of the second lock pin 38, extending to the rear side of the base plate 54 and is connected to the second lever 28 through the pin 44.

Designated at 74 in FIGS. 3 and 4 is a snap action spring confined between the base plate 54 and the second lever 28, for biasing the second lever 28 in the projecting and retracting directions of the lock pin. Denoted at 76 is a sub-base secured to the base plate 54 in a manner to rotatably support the ends of one side of the rotary shafts 26B and 28B of the first and the second levers 26 and 28 and to shield the gears 26A and 28A from the front side.

The first lever 26, when rotated in the clockwise direction in FIG. 4, drives the first lock pin 36 in the projecting direction thereof through the first link 66, and, when rotated in the counterclockwise direction, drives the first lock pin 36 in the retracting direction thereof.

Furthermore, the second lever 28 is adapted to drive the second lock pin 38 in a direction reverse to the first lever 26.

Provided on the base plate 54 are first and second stoppers 78 and 80 for controlling rotations of the first and the second levers 26 and 28 in the projecting and the retracting directions thereof.

The first stopper 78 comprises one of a plurality of pins for supporting the sub-base 76.

Furthermore, the second stopper 80 is formed by cutting and bending (shaving) a portion of the base plate 54 toward the rear side thereof.

As shown in FIG. 4, the first lever 26 abuts against the first stopper 78 in the clockwise direction, and the second lever 28 abuts against the second stopper 80 in the clockwise direction.

Designated at 82 in FIG. 4 is a pawl supported by a shaft 84 in a manner to rock about the shaft 84 on the front surface of the base plate 54.

The forward end 82A of the pawl 82 may take either one of two positions including a position where it engages an engageable recess 26C formed in the first lever 26 to preclude rotation of the first lever 26 in the counterclockwise direction when the first lever 26 rotates in the clockwise direction to abut against the first stopper 78 and a position where it is disengaged from the engageable recess 26C to permit rotation of the first lever 26 in the counterclockwise direction.

The other end 82B of the pawl 82 is bent at right angle in a manner to be projected toward the rear side of the base plate 54 through a hole 54A formed in the base plate 54.

The base plate 54 is formed with a struck out part 54B raised toward the rear side of the base plate 54 at a position spaced apart from the hole 54A in the direction toward the first lock pin 36.

A tension coil spring 86 is provided between the shaving 54B and the other end 82B of the pawl 82, whereby the pawl 82 is biased in the clockwise direction in FIG. 4, i.e., in the direction in which the forward end 82A is engaged with the engageable recess 26C of the first lever 26.

A release lever 88 is coaxially and rotatably supported on the rotary shaft 84 rotatably supporting the pawl 82. This release lever 88 abuts against the other end 82B of the pawl 82 in the counterclockwise direction in FIG. 4, so that the other end 82B can be driven by the release lever against the tensile force of the tension coil spring 86 in the counterclockwise direction. Furthermore, the release lever 88 is adapted to be freely rotatable with the pawl 82 in the clockwise direction in FIG. 4.

Denoted at 90 in FIG. 4 is a control knob secured to the forward end of the release lever 88.

Designated at 92 in FIGS. 3 and 4 is a key-locking device for holding the lock device in the locked state.

This key-locking device 92 is comprises by a key cylinder 96 locked and fixed to the base plate 54 by a bolt 94 and a key cylinder lever 98 secured to a key rotor, not shown, of the key cylinder 96. In the key-locking device 92, when the key cylinder 98 is at a stroke end position in the clockwise direction as shown in FIG. 4, the key cylinder lever 98 abuts against the release lever 88 to prevent the release lever 88 from rotating in the counterclockwise direction, i.e., rotating in a direction to drive the pawl 82 in the counterclockwise direction.

Furthermore, when rotated in the counterclockwise direction in FIG. 4, the key cylinder lever 98 allows the release lever 88 to move in the counterclockwise direction to drive the pawl 82 in the counterclockwise direction, whereby the forward end 82A slips out of the engageable recess 26C of the first lever 26.

Description will hereunder be given of the action of this embodiment.

First, description will be given of adjusting work at the time of mounting the guide 30 to the mounting hole 108.

The guide 30 is inserted into the mounting hole 108 of the lock base 50 at the optimal engageable positions, and the engageable recesses 108A, so that the guide 30 can be mounted to the mounting hole 108.

In this state, the detachable roof 22 is closed, the first and the second lock pins 36 and 38 are projected and inserted into the lock holes 34 on the vehicle body sides, whereby the detachable roof 22 is locked.

At this time, when there is no positional difference between the outer surface of the detachable roof 22 and the main roof body surface 12 in the locked state, the guide 30 is fixed by means of the retainer 14, thus completing the work.

When there occurs a positional difference between the outer surface of the detachable roof 22 and the main roof body surface 12, the engaged positions 30B of the guide 30 and the engageable recesses 108A of the mounting hole 108 are suitably changed to make adjustment such that the positional difference can be minimized by rotating guide 30 to the most appropriate fixed position about the axis of the guide 30.

Therefore, the retainer 114 is inserted to be engaged with the slits 30D of the guide 30, whereby the guide 30 is fixed to the lock base 50, thus completing the work.

Figure 8:
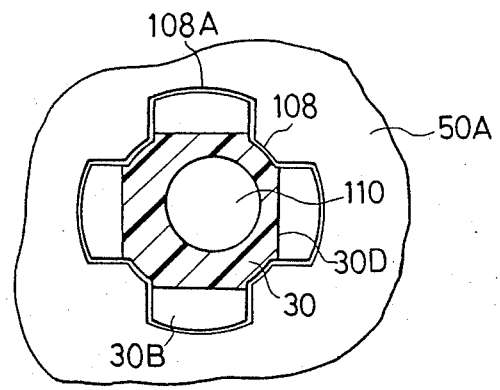
FIGS. 8A and 8B are front views showing the positional relationship between the guide and the mounting hole for the guide in the above embodiment.
Figure 8:
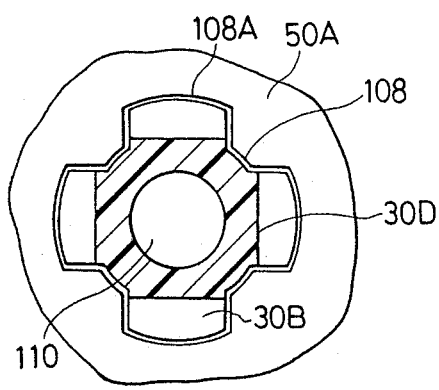

Furthermore, when errors in manufacture and the like are low, and the mounting hole 108 and the lock hole 34 are aligned without requiring any adjustment, a guide 30 having a non-eccentric guide hole 110 is inserted into the mounting hole 108 and fixed thereto as shown in FIG. 8 (B).

Here, when the detachable roof 22 has errors in assembling in the direction of the normal line to the outer surface 22A thereof and the direction perpendicularly intersecting the normal line with respect to the main roof body surface 12, a shift in position between the detachable roof and the main roof body surface becomes maximal.

In order to minimize such positional differences, in the above embodiment, the direction of eccentricity of the guide hole 110 of the guide 30 is determined such that the center of the guide hole 110 is located on the normal line 120 to the outer surface 22A, passing through the center of the mounting hole 108, or on the straight line 122 passing through the center of the mounting hole 108 and perpendicularly intersecting the normal line 120, so that the errors in assembling can be satisfactorily eliminated by rotating guide 30 to the fixed position minimizing the positional differences.

In general, a surface 124 of the garnish 52 covering the lock base 50 on the compartment's side is disposed in a direction perpendicularly intersecting the normal line 120.

Furthermore, the surface 124 of the garnish 52 on the compartment side makes an angle of about 45° with the horizontal line 116 and the vertical line 118.

As a consequence, when the engageable recesses 108A of the mounting hole 108 are formed in a manner to extend toward the horizontal line 116 and the vertical line 118, the position of the surface 124 on the compartment's side can be brought to a position most close to the outer surface 22A of the detachable roof 22. In other words, decrease in volume of the compartment can be made minimal.

The lock device 24 shown in FIGS. 3 and 4 is in the locked state when the detachable roof 22 is mounted to the roof opening 16.

In this state, the first and the second lock pins 36 and 38 are in the positions projecting in the directions of the forward ends, respectively, and inserted in the lock holes 34 on the vehicle body sides, whereby the detachable roof 22 cannot be detached.

In this state, the first lever 26 abuts against the first stopper 78.

Furthermore, the forward end 82A of the pawl 82 is engaged with the engageable recess 26C of the first lever 26, whereby the first lever 26 is prevented from rotating in the counterclockwise direction in FIG. 4, i.e. rotating in the unlocking direction.

This state of the pawl 82 is maintained by the tensile force of the tension coil spring 86.

Furthermore, as shown in FIG. 4, when the key-locking device 92 is held in the locked state, the key cylinder lever 98 thereof is in the position of abutting against the release lever 88, whereby the release lever 88 is prevented from rotating, so that the forward end 82A of the pawl 82 cannot slip out of the engageable recess 26C of the first lever 26.

Figure 5:
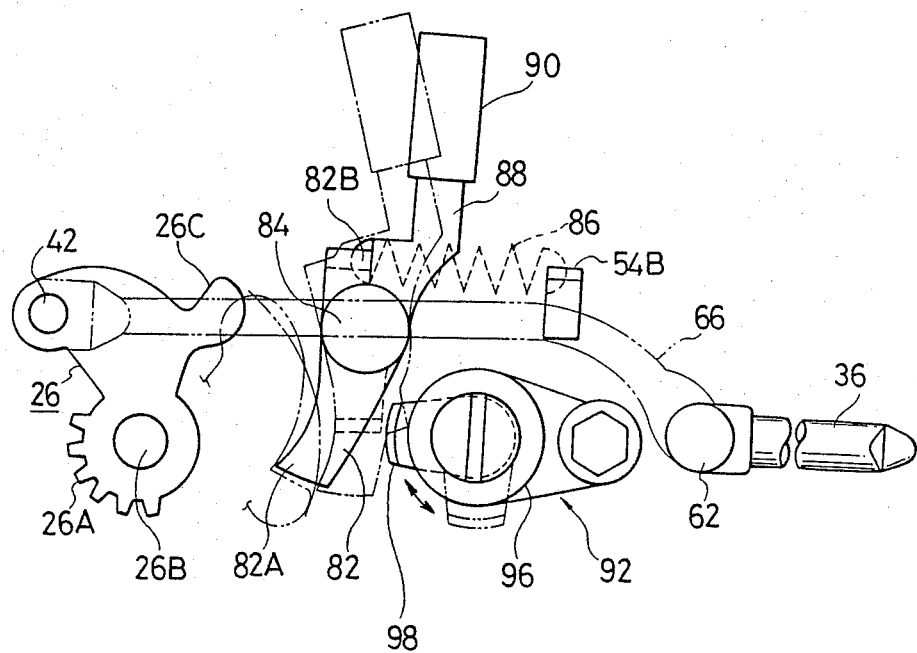
FIG. 5 is a gneral plan view showing the positional relationship between the first lever, a locking pawl, a release lever and a locking device.
Figure 6:
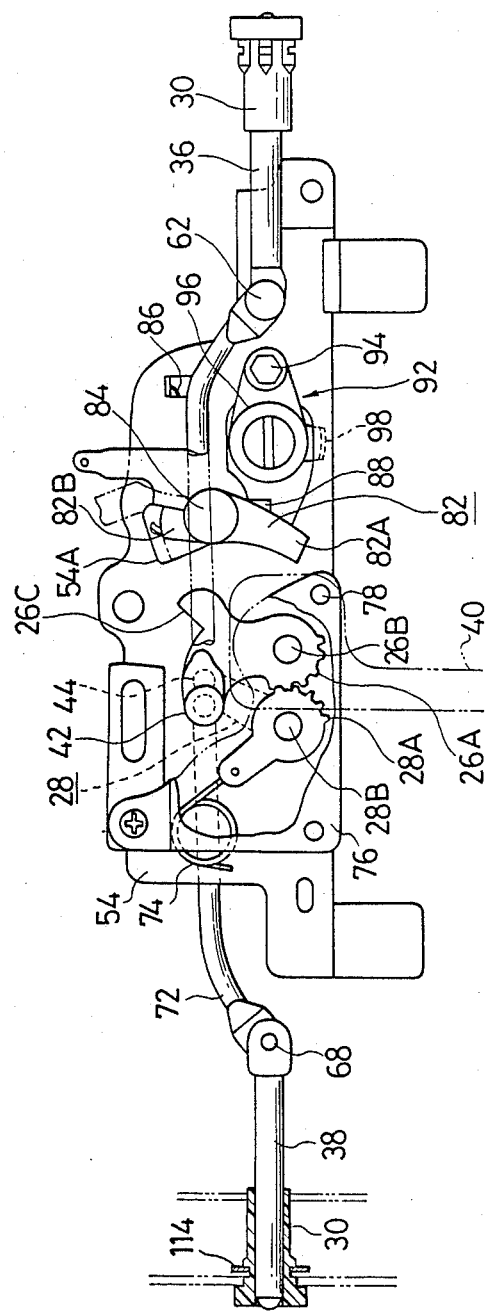
FIG. 6 is a plan view showing the unlocked state in the above embodiment, similar to FIG. 4.
Figure 7:
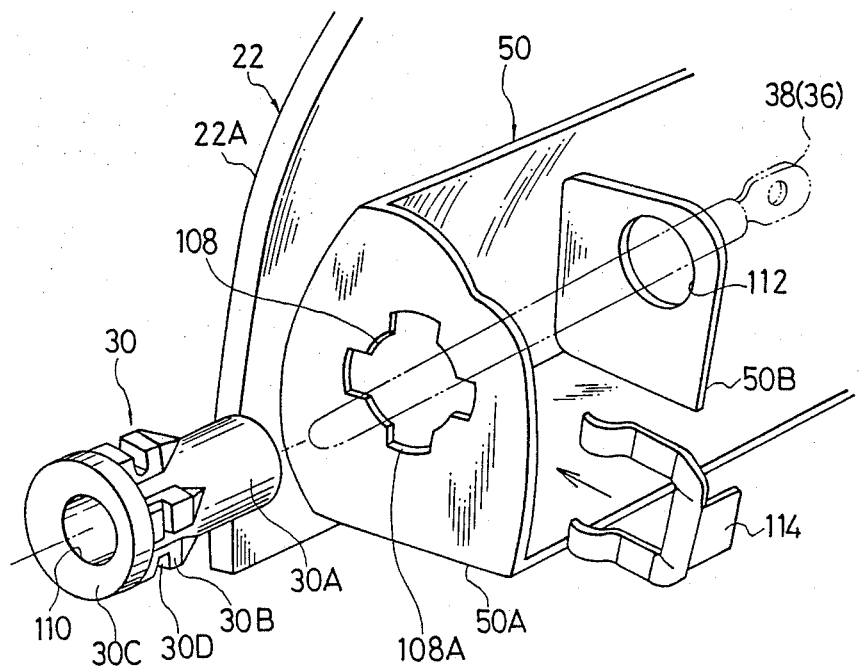
FIG. 7 is a disassembled perspective view showing the essential portions of one embodiment of the present invention.

Subsequently, when a key, not shown, is inserted into the key cylinder 96 and driven in the unlocking direction, the release lever 88 can rotate in the lock releasing direction, i.e., the counterclockwise direction in the drawings as shown in FIGS. 5 and 6.

Therefore, turning of the knob 90 by an occupant of the motor vehicle in the counterclockwise direction causes the release lever 88 to drive the pawl 82 in the counterclockwise direction, whereby the forward end 82A is disengaged from the engageable recess 26C of the first lever 26.

Subsequently, when the control lever 40 is rotated from a position shown in FIG. 4 through about 90° in the counterclockwise direction, the first lever 26 connected thereto is similarly rotated through about 90° in the counterclockwise direction.

Simultaneously, the second lever 28 operationally associated with the first lever 26 via the gears 26A and 28A rotates through about 90° in the clockwise direction.

Turning motions of the first lever 26 and the second lever 28 are converted by the first link 66, the pins 62 and 42, and the second link 72, and the pins 68 and 44 as being the connecting mechanisms 32 into motion retracting the first lock pin 36 and the second lock pin 38, respectively. These retracting motions are transmitted to the first and the second lock pins 36 and 38. Accordingly, the first and the second lock pins 36 and 38 are brought into retracted states as shown in FIG. 6 and a major portion of these lock pins are retracted inwardly of the guides 30.

As a consequence, the first lock pin 36 and the second lock pin 38 are disengaged from the lock holes 34 formed in the vehicle body sides, so that the detachable roof 22 can be removed from the roof 12.

At this time, as shown in the planar view of FIG. 6, the first lever 26 and the second lever 28 are overlapped with each other in the thicknesswise direction of the levers. However, the first and the second levers 26 and 28 are shifted in position from each other as described above, so that these levers do not interfere with each other.

Therefore, sufficient strokes of the pins 42 and 44 can be taken, whereby reciprocatory strokes of the first and the second lock pins 36 and 38 can be extended. Thus, the lengths of the lock pins 36 and 38 inserted into the lock holes 34 can be extended.

Additionally, after the first and the second levers 26 and 28 are rotated through a predetermined angle in the unlocking direction, even if the release lever 88 biased by spring 86 is released to a free condition, the forward end 82A of the pawl 82 merely lays idle, away from the first lever 26 so that the forward end 82A does not interfere with the rotations of the first and the second levers 26 and 28.

Furthermore, when the first and the second lock pins 36 and 38 are projected from the unlocked states as shown in FIG. 6 to be engaged with the lock holes 34, the control lever 40 is rotated in a direction reverse to the above.

At this time, the first lever 26 interferes with the forward end 82A of the pawl 82, however, if the pawl 82 is pushed against the tensile force of the tension coil spring 86 in the counterclockwise direction in FIG. 6, then the first lever 26 returns together with the second lever 28 to the locked states as shown in FIG. 4.

Figure 10:
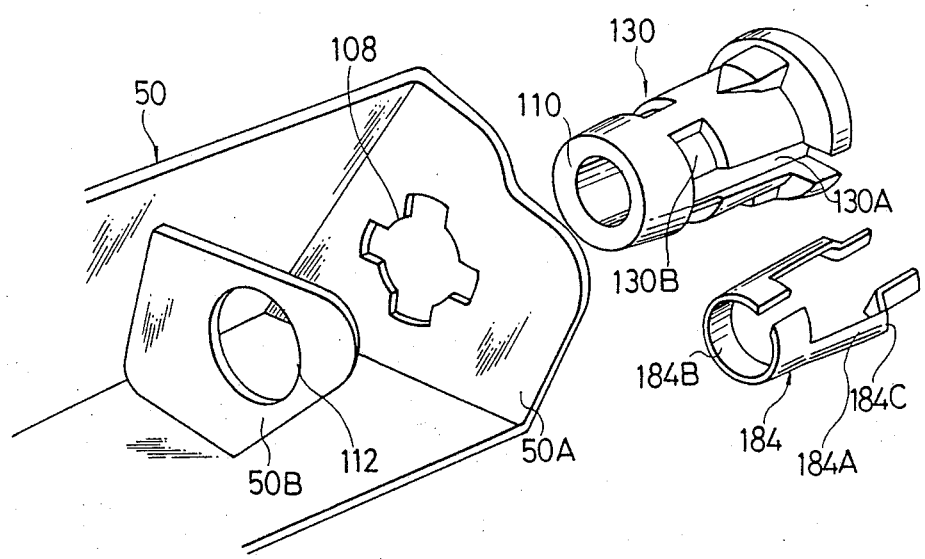
FIG. 10 is a disassembled perspective view showing a second embodiment of the present invention.
Figure 11:
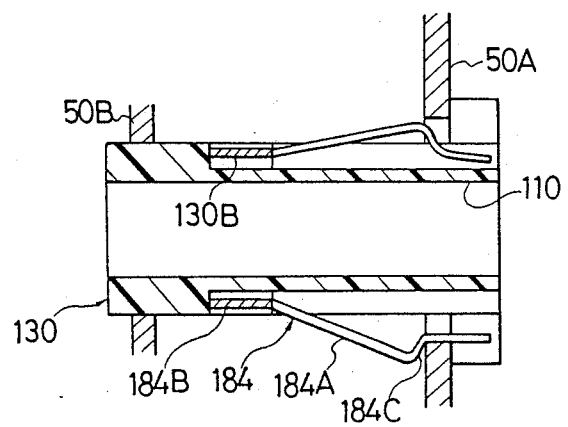
FIG. 11 is a sectional view showing the assembled state of the second embodiment.

Description will hereunder be given of the second embodiment of the present invention with reference to FIGS. 10 and 11.

This second embodiment is of such an arrangement that there is provided a guide 130 which is fixed to the mounting hole 108 in the axial direction of the mounting hole 108 by a plate spring 184 secured to the outer surface thereof.

Here, the guide 130 has a pair of longitudinal grooves 130A formed on the outer surface aligned with the axial line thereof and a circumferential groove 130B formed on an intermediate portion in the axial direction thereof extending in a circumferential direction.

The plate spring 184 includes: a pair of longitudinal members 184A coupled into the longitudinal grooves 130A of the guide 130; and a circularly arcuate member 184B coupled into the circumferential groove 130B.

The longitudinal members 184A of the plate spring 184 are normally adapted to spread resiliently and radially outwardly, and each is provided with a stepped portion 184C engageable with a corner portion of a rear surface of the mounting hole 108.

As a consequence, in this embodiment, the guide 130 is inserted into the mounting hole 108 in the state where the plate spring 184 is coupled into the guide 130, so that the guide 130 can be fixed.

To draw the guide 130 out of the mounting hole 108, the forward end portions of the longitudinal members 184A of the plate spring 184 should be pushed radially inwardly to remove the stepped portions 184C from the rear surface of the mounting hole 108.

Figure 12:
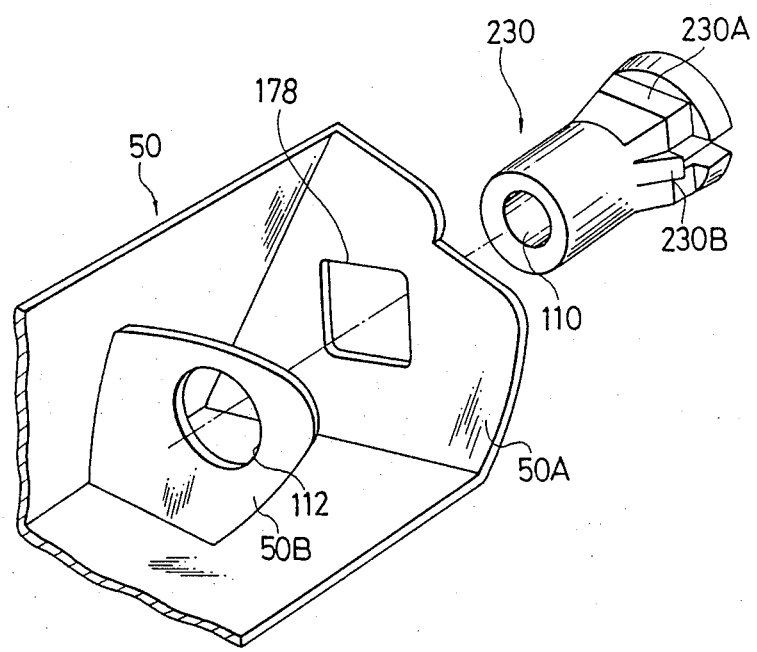
FIG. 12 is a disassembled perspective view showing a third embodiment of the present invention.
Figure 13:
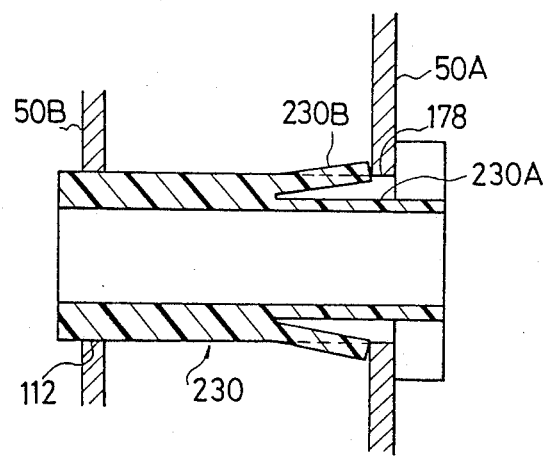
FIG. 13 is a sectional view showing the assembled state of a third embodiment.

Description will hereunder be given of the third embodiment of the present invention with reference to FIGS. 12 and 13.

This third embodiment is of such an arrangement that a mounting hole 178 provided in the rib 50A of the lock base 50 is formed to provide a square hole, and a guide 230 opposed to the mounting hole 178 is formed with square shaped portions 230A to meet the shape of the mounting hole 178.

The guide 230 in this third embodiment is provided with a pair of flexible fins 230B projecting outwardly, located adjacent the square shaped portions 230A and closer to the forward end of the guide 230 than the square shaped portions.

These flexible fins 230B project to and engage the rear surface of the mounting hole 178 when the guide 230 is inserted into the mounting hole 178, thus constituting a lock against dislodging of the guide 230 (Refer to FIG. 13).

Additionally, in the above embodiment, the shapes of the mounting hole and the guide are determined such that four different engaged and fixed positions can be obtained around the respective axes, however, the present invention need not necessarily be limited to this, and such an arrangement may be adopted that at least two or more fixed positions can be obtained.

Furthermore, as shown in FIG. 9, the direction of eccentricity of the guide hole 110 is located on the normal line 120 or the straight line 122, each of which are oriented at an angle of about 45° to horizontal line 116 and the vertical line 118. However, the present invention need not necessarily be limited to this.

More specifically, any of such arrangements may be adopted that the direction of eccentricity of the guide hole 110 is determined such that the guide 30, 130 or 230 change the fixed positions around the axes thereof relative to the mounting holes 108 or 178, so that a positional difference between the outer surface 22A of the detachable roof 22 and the general surface of the roof 12 in the locked state can be minimized.

Additionally, in the above embodiment, the first lever 26 and the second lever 28 are operationally associated with each other through the meshing engagement between the gears 26A and 28A, however, the present invention need not necessarily be limited to this, and the first and the second levers 26 and 28 may be other types which can rotate in directions opposite to and in synchronism with each other.

For example, the both levers may be brought into synchronism by frictional contact and rotated in directions opposite to each other. More specifically, the first lever 26 and the second lever 28 may be in the relationship of contact including sliding contact such as gears and frictional contact such as friction wheels.

Furthermore, in the above embodiment, the connecting mechanism 32 interposed between the lock pin and the lever includes the link and the pins on the opposite ends of the link. However, in short, the connecting mechanisms 32 may be of other types which can convert the turning motions of the first and the second levers 26 and 28 into the reciprocatory motions of the first and the second lock pins 36 and 38. As a consequence, the connecting mechanisms 32 may be ones in which the first and the second lock pins 36 and 38 are connected to the first and the second levers 26 and 28 without the links.

Figure 14:
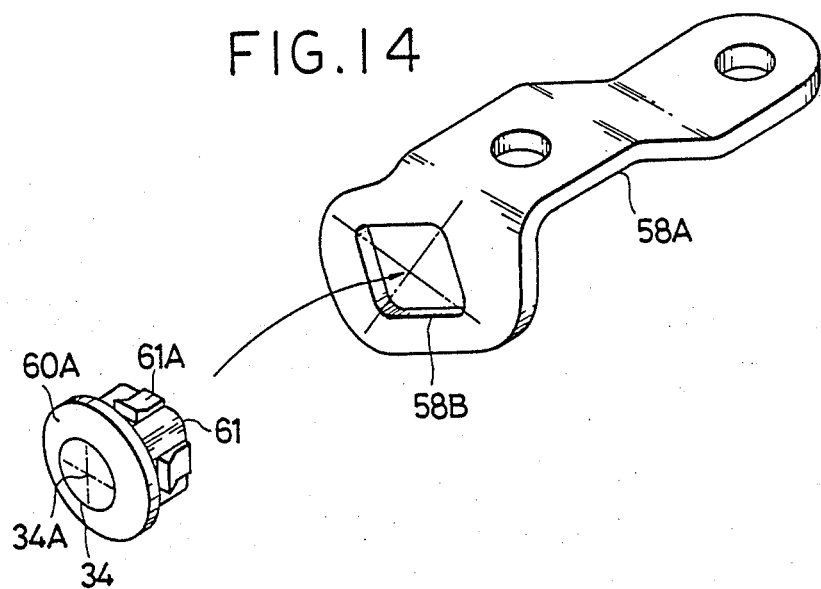
FIG. 14 is a disassembled perspective view showing the essential portion of a fourth embodiment of the present invention.

Further, in the above embodiment, the positions of mounting the guides for guiding the lock pins around the center axis of the mounting holes when mounting the guides to the detachable roof have been adjusted, however, the present invention need not necessarily be limited to this, and, as shown in FIG. 14, the lock holes 34 are made eccentric to the center axes of the lock pins 36 and 38 and can take pluralities of fixed positions around the center axes.

In this case, a bracket 58A fixed to the body has a square hole 58B, while, a guide bush 60A formed therein with a lock hole 34 has square insertion portions 61 to be coupled into the square hole 58B so that the square hole 58B can take four fixed positions around the center axis thereof.

The lock hole 34 is made eccentric to the center axis of this guide bush 60A.

Designated at 61A are pawls engageable with the bracket 58A when the insertion portions 61 is inserted into the square hole 58B.

Figure 15:
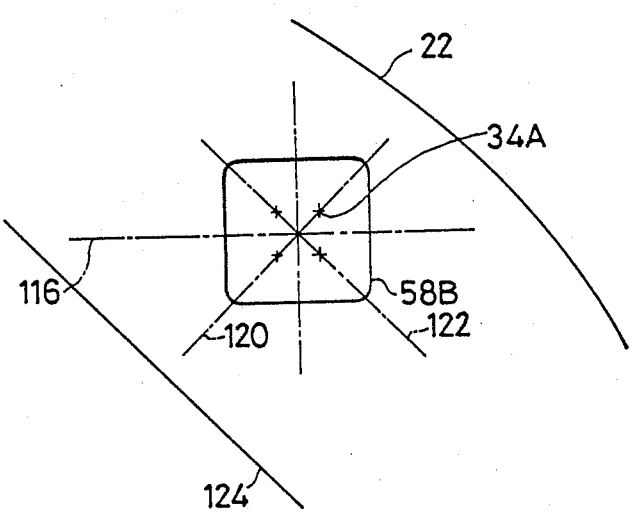
FIG. 15 is a schematic front view showing the positional relationship between a mounting hole for a guide bush and the outer surface of the detachable roof in the above embodiment.

Additionally, as shown in FIG. 15, the direction of eccentricity of the center 34A of the lock hole 34 is the same as in the embodiment shown in FIG. 9, so that detailed description will be omitted.

What is claimed is:

1. A device for locking a detachable roof in a motor vehicle, comprising:
   first and second levers rotatably mountable to said detachable roof in contact with each other in a manner to be rotatable in synchronism with each other in directions opposite to each other;
   first and second lock pins axially, linearly, movably supportable on said detachable roof by means of guides mountable at positions opposite to each other on said detachable roof with the first and second levers interposed therebetween, said first and second lock pins being connected to the first and the second levers, respectively, through connecting mechanisms, and insertable at forward ends thereof into lock holes formed in a motor vehicle body and opposed to the lock pins; and
   a control lever connected to one of the first and second levers to rotate the same, wherein at least one of said guides is insertable into a mounting hole of said detachable roof in an axial line of the lock pin and supported thereby; cross sections of the mounting hole and said guide to be inserted into the mounting hole are of such shapes respectively that said guide can take a plurality of fixed positions around the center axis of the mounting hole determined by the interfitted cooperation of the mounting hole and said guide, whereby a guide hole for guiding the lock pin in the guide is made eccentric with the center axis of the mounting hole.

2. A device for locking a detachable roof in a motor vehicle as set forth in claim 1, wherein the shape of said mounting hole is symmetrical about two perpendicular axes.

3. A device for locking a detachable roof in a motor vehicle as set forth in claim 1, in combination with said detachable roof, wherein in a state where said guide is mounted to said mounting hole at one of the plurality of mounted positions, the guide hole in said guide is made eccentric such that the center axis of the guide hole is located along either one of a line normal to the outer surface of the detachable roof and passing through the center of said mounting hole, and a straight line perpendicularly intersecting the normal line and passing through the center of said mounting hole.

4. A device for locking a detachable roof in a motor vehicle as set forth in claim 2 in combination with said detachable roof, wherein in a state where said guide is mounted to said mounting hole at one of the plurality of mounted positions, the guide hole in said guide is made eccentric such that the center axis of the guide hole is located along either one of a line normal to the outer surface of the detachable roof and passing through the center of said mounting hole, and a straight line perpendicularly intersecting the normal line and passing through the center of said mounting hole.

5. A device for locking a detachable roof in a motor vehicle as set forth in claim 1, wherein cross sections of said mounting hole and said guide respectively are of generally cross shape.

6. A device for locking a detachable roof in a motor vehicle as set forth in claim 2, wherein cross sections of said mounting hole and said guide respectively are of generally cross shape.

7. The combination as set forth in claim 3, wherein cross sections of said mounting hole and said guide respectively are of generally cross shape.

8. The combination as set forth in claim 4, wherein cross sections of said mounting hole and said guide respectively are of generally cross shape.

9. A device for locking a detachable roof in a motor vehicle as set forth in claim 1, wherein a straight line from the center of the eccentric guide hole to the center axis of the mounting hole is inclined with respect to the horizontal line.

10. A device for locking a detachable roof in a motor vehicle as set forth in claim 2, wherein a straight line from the center of the eccentric guide hole to the center axis of the mounting hole is inclined with respect to a horizontal line.

11. A device for locking a detachable roof in a motor vehicle as set forth in claim 3, wherein a straight line from the center of the eccentric guide hole to the center axis of the mounting hole is inclined with respect to a horizontal line.

12. A device for locking a detachable roof in a motor vehicle as set forth in claim 4, wherein a straight line from the center of the eccentric guide hole to the center axis of the mounting hole is inclined with respect to a horizontal line.

13. A device for locking a detachable roof in a motor vehicle as set forth in claim 5, wherein a straight line from the center of the eccentric guide hole to the center axis of the mounting hole is inclined with respect to a horizontal line.

14. A device for locking a detachable roof in a motor vehicle as set forth in claim 6, wherein a straight line from the center of the eccentric guide hole to the center axis of the mounting hole is inclined with respect to a horizontal line.

15. A device for locking a detachable roof in a motor vehicle as set forth in claim 7, wherein a straight line from the center of the eccentric guide hole to the center axis of the mounting hole is inclined with respect to a horizontal line.

16. A device for locking a detachable roof in a motor vehicle as set forth in claim 8, wherein a straight line from the center of the eccentric guide hole to the center axis of the mounting hole is inclined with respect to a horizontal line.

17. A device for locking a detachable roof in a motor vehicle as set forth in claim 1, wherein at least one of said lock holes is formed in a guide bush inserted into a mounting hole on the motor vehicle body in an aixal line of the lock pin and supported thereby; cross sections of the mounting hole and said guide bush to be inserted into the mounting hole are of such shapes respectively that said guide bush can take a plurality of fixed positions around the center axis of the mounting hole; and said lock hole is made eccentric with the center axis of the mounting hole.

18. A device for locking a detachable roof in a motor vehicle as set forth in claim 17, wherein the shape of said mounting hole is symmetrical about two perpendicular axes.

19. A device for locking a detachable roof in a motor vehicle as set forth in claim 17 in combination with said detachable roof, wherein in a state where said guide bush is mounted to said mounting hole at one of the plurality of mounted positions, the lock hole in said guide bush is made eccentric such that the center axis of the lock hole is located along either one of a line normal to the outer surface of the detachable roof and passing through the center of said mounting hole, and a straight line perpendicularly intersecting the normal line and passing through the center of said mounting hole.

20. A device for locking a detachable roof in a motor vehicle as set forth in claim 17, wherein a straight line from the center of the eccentric lock hole to the center axis of the mounting hole is inclined with respect to a horizontal line.

* * * * *